(12) United States Patent
Anderson

(10) Patent No.: US 7,594,347 B2
(45) Date of Patent: Sep. 29, 2009

(54) LICENSE PLATE HOLDER

(76) Inventor: Wayne A. Anderson, 417 American Legion Rd., Greer, SC (US) 29651

( * ) Notice: Subject to any disclaimer, the term of this patent is extended or adjusted under 35 U.S.C. 154(b) by 90 days.

(21) Appl. No.: 11/454,341

(22) Filed: Jun. 16, 2006

(65) Prior Publication Data

US 2007/0289176 A1    Dec. 20, 2007

(51) Int. Cl.
*G09F 7/00* (2006.01)

(52) U.S. Cl. .......................... 40/200; 40/209

(58) Field of Classification Search ........... 40/200–211, 40/643, 653, 611.01, 611.13, 777, 778; 248/221.12, 248/205.2
See application file for complete search history.

(56) References Cited

U.S. PATENT DOCUMENTS

| | | | |
|---|---|---|---|
| 1,086,445 A * | 2/1914 | Devlin ................... 248/288.51 |
| 1,140,904 A * | 5/1915 | Kiernan ........................ 40/537 |
| 1,248,043 A * | 11/1917 | Ware ........................... 40/209 |
| 1,386,751 A * | 8/1921 | Young ......................... 40/209 |
| 1,519,575 A * | 12/1924 | Davis .......................... 40/209 |
| 1,536,598 A * | 5/1925 | Abel ........................... 40/200 |
| 2,085,187 A * | 6/1937 | Engel .......................... 40/778 |
| 2,160,960 A * | 6/1939 | Dinstbir ....................... 40/209 |
| 2,775,832 A | 1/1957 | Vizza |
| 3,147,944 A | 9/1964 | Waschevski |
| 3,196,508 A | 7/1965 | Carter |
| 3,206,883 A * | 9/1965 | Crawford ..................... 40/209 |
| 3,260,149 A | 7/1966 | Deaver |
| 3,262,174 A | 7/1966 | Duna |
| 3,430,376 A * | 3/1969 | Fritz et al. .................... 40/209 |
| 3,509,653 A | 5/1970 | Hummel |
| 3,755,945 A | 9/1973 | McEwen et al. |
| 3,867,776 A * | 2/1975 | Drummond et al. ........... 40/209 |
| 4,813,167 A * | 3/1989 | Means ......................... 40/210 |
| 4,918,792 A | 4/1990 | Engels |
| 5,494,247 A | 2/1996 | Louder |
| 5,815,965 A | 10/1998 | de Greeve |
| 5,870,841 A | 2/1999 | Brody, II et al. |
| 6,796,060 B1 | 9/2004 | Meester et al. |
| 6,848,204 B1 | 2/2005 | Nowak |
| 2004/0094677 A1* | 5/2004 | Guo et al. ................ 248/205.2 |
| 2004/0163287 A1* | 8/2004 | Swartz ......................... 40/209 |

OTHER PUBLICATIONS

Industrial Strength Velcro—Front License Plate; http://www.elisetalk.com/forums/showthread.php?t=11189; Apr. 9-16, 2005.*

* cited by examiner

*Primary Examiner*—Lesley D Morris
*Assistant Examiner*—Christopher E Veraa
(74) *Attorney, Agent, or Firm*—J. Bennett Mullinax, LLC

(57) ABSTRACT

A license plate holder is provided. The license plate holder includes a frame that has a front surface that is flat. The frame is configured for being attached to a vehicle. A retaining member is present and is carried by the frame. The retaining member is configured for being shaped by a user so as to be capable of contacting a license plate to retain the license plate to the frame. The retaining member is also configured for being shaped by a user to allow the license plate to be removed from the frame.

17 Claims, 5 Drawing Sheets

LICENSE PLATE HOLDER

FIELD OF THE INVENTION

The present invention relates generally to a holder for retaining a license plate to a motor vehicle. More particularly, the present application involves a license plate holder that can include advertising indicia that allows a salesman to quickly and easily attach and detach a license plate to and from a motor vehicle.

BACKGROUND

New and used automobile dealers typically manage a large amount of vehicle inventory. Vehicles located on the dealer's lot do not usually have a license plate affixed thereto. Instead, these vehicles are generally provided with a plate that has advertising indicia and is located where the license plate is normally attached. Vehicles are driven from the dealer's lot by a customer or salesman for demonstration or evaluation purposes. Further, vehicles may be moved from dealer's lots when traded with other dealers for customer or when purchased from automobile auctions. State laws often require a vehicle to be equipped with a dealer license plate whenever the vehicle is driven from the dealer's lot or automobile auction.

In order to affix a dealer license plate to the vehicle, the salesman may remove the advertising plate and substitute the dealer license plate. The salesman can then insert one or more screws through the dealer license plate in order to attach this plate to the vehicle in much the same manner as regular license plates are attached to vehicles. After the vehicle is returned to the lot, the salesman can then remove the screws and dealer license plate and reinstall the advertising plate. This method is time consuming in that the salesman must insert a set of screws once and remove the set of screws twice. Additionally, more time may be consumed in locating a screwdriver, for use in inserting and removing the screws, if one is not initially available. With the regularity of the need to affix and remove dealer license plates, such a method is problematic in that it requires a significant amount of time of the salesman, dealer driver and auction driver.

Devices have been proposed in order to address the need for a temporary mounting device for dealer license plates. Some devices employ a magnet onto which a dealer license plate is attached. The dealer license plate can be clamped directly onto the magnet, or the license plate can be affixed to a frame which is in turn attached to the magnet. This assembly is attached through magnetic attraction onto the body of the motor vehicle. Magnetic assemblies are problematic in that they can scratch the exterior of the vehicle. Magnetic assemblies are also known to become detached during normal use of the vehicle when passing over bumps in the road or otherwise experiencing vibration. Additionally, the dealer license plate will be more easily noticed by members of the public as the magnetic assembly can be placed at a variety of locations on the vehicle instead of only at the normal locations license plates are affixed. The chance of theft is thus increased as the magnetic assembly draws more attention from the public and does not require any tools for removal. Further, as the amount of dealer inventory is large, such magnetic assemblies are commonly misplaced and lost through the course of business. Also, vehicles are now and will be in the future made with less metal thus preventing the use of magnetic attachment.

Other methods of mounting a dealer license plate involve placing the plate in the rear window of the vehicle. This approach may be problematic in that a portion of the window is obscured thus negatively impacting the ability of the driver to see. Further, glare from the window may make the dealer license plate difficult to view. Other devices are known in which the dealer license plate is housed inside of a transparent window. These types of devices may be problematic in that the window can become dirty through the elements or through degradation of the material making up the window thus making it difficult to view the license plate.

It is also known to use different types of mechanical clamps or other devices to affix the dealer license plate to the vehicle at the same location the normal license plate is attached. Mechanical clamps of this sort often become lost at the dealer's lot through the course of normal business. Additionally, such clamps often do not securely affix the dealer license plate thus resulting in rattling or having the license plate fall off during driving. As such, there remains room for variation and improvement within the art.

SUMMARY

Various features and advantages of the invention will be set forth in part in the following description, or may be obvious from the description, or may be learned from practice of the invention.

The present invention provides for a license plate holder that has a frame with a flat front surface. The frame is configured for being attached to a vehicle. A retaining member is present and is carried by the frame. The retaining member is configured for being shaped by a user to be capable of contacting a license plate for retaining the license plate to the frame. The retaining member is configured for being shaped by the user in order to be capable of allowing the license plate to be removed from the frame.

Also provided for in accordance with one aspect of the present invention is a license plate holder as immediately discussed that further includes a holding member. The holding member is carried by the frame and is configured for retaining the license plate to the frame.

Another aspect of the present invention resides in a license plate holder as immediately discussed in which the holding member is a flexible strip. The frame and the holding member define a pocket for receiving two edges of the license plate.

The present invention also provides, in one aspect, a license plate holder as discussed above in which a pair of retaining members and a pair of holding members are carried by the frame. The combination of the retaining members and holding members is configured for retaining the license plate to the frame.

Another aspect of the present invention resides in a license plate holder as discussed above in which the frame and the retaining member are configured for retaining the license plate onto the front surface of the frame. Less than 20% of the surface area of the front surface of the license plate is covered by the frame and the retaining member.

An additional exemplary embodiment of the present invention exists in a license plate holder as discussed above that further includes a ring. The ring is configured for attachment to a vehicle so as to be contiguous with the front surface of the frame. A pair of holding members are present. The holding members are carried by the frame and are configured for retaining the license plate to the ring. The retaining member is configured for being shaped by a user so as to be capable of contacting the license plate for retaining the license plate to the frame and the ring. The retaining member is configured for being shaped by a user so as to be capable of allowing the license plate to be removed from the frame and the ring.

The present invention also provides for a license plate holder that has a frame with a front flat surface. The frame is configured for being attached to a vehicle. At least two holding members are carried by the frame. The holding members are configured for retaining the license plate to the frame. Each of the holding members is configured for contacting the front surface and two edges of the license plate.

An additional aspect of the present invention resides in a license plate holder as immediately discussed that further includes a retaining member. The retaining member is carried by the frame and is configured for being shaped by a user so as to be capable of contacting the front surface of the license plate to retain the license plate to the frame. The retaining member is configured for being shaped by a user so as to be capable of allowing the license plate to be removed from the frame.

Yet another aspect of the present invention exits in a license plate holder as discussed above in which each of the holding members is a flexible strip. The frame and each of the holding members define a pocket for receiving two edges of the license plate.

Another aspect of the present invention resides in a license plate holder as discussed above in which the front flat surface of the frame has advertising indicia located thereon.

A further aspect of the present invention exists in a license plate holder as previously discussed in which the frame and the holding members are configured for retaining the license plate to the front surface of the frame. Less than 20% of the surface area of the front surface of the license plate is covered by the frame and the holding members.

An additional aspect of the present invention exists in a license plate holder as previously mentioned that further includes a ring. The ring is configured for attachment to a vehicle so as to be continuous with the front surface of the frame.

The present invention provides for a license plate holder that has a frame with a flat front surface. The frame is configured for attachment with a vehicle. A license plate is also present and has a front and back surface. A hook and loop type fastener is included that releasably attaches the front surface of the frame to the back surface of the license plate.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
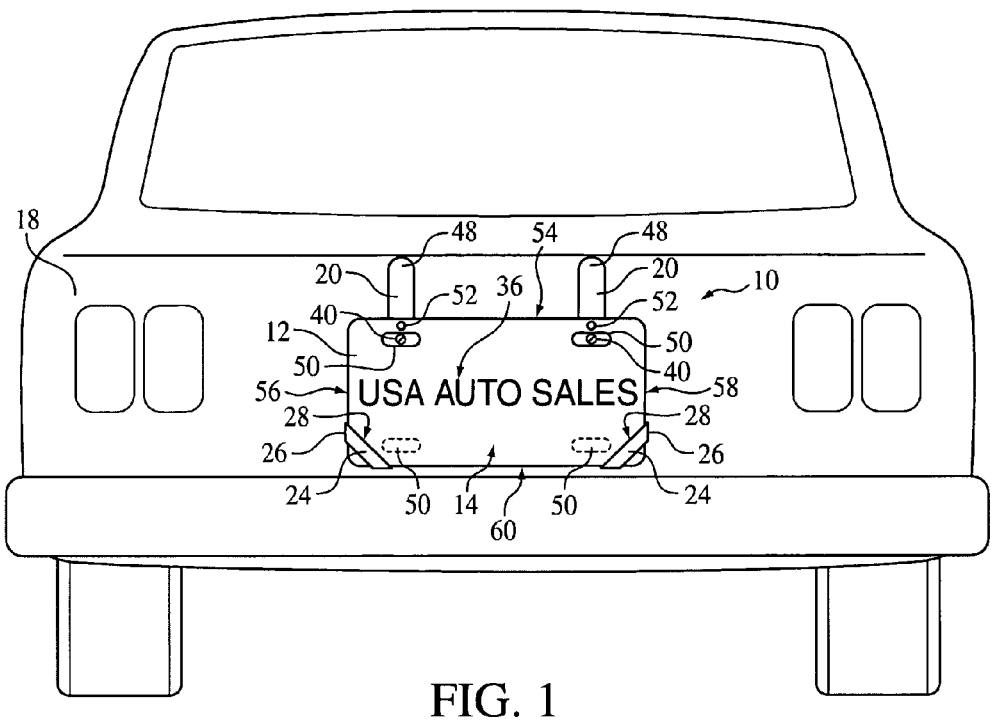
FIG. 1 is a front view of a license plate holder attached to a vehicle in accordance with one exemplary embodiment of the present invention.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to about 7 also includes a limit of up to about 5, up to about 3, and up to about 4.5.

The present invention provides for a license plate holder 10 that can be used to quickly attach and detach a license plate 22 to a vehicle 18. The license plate holder 10 can be used in automobile dealerships that sell new and used automobiles. The license plate holder 10 is affixed to the vehicle 18 at the same location a license plate 22 is normally attached. The license plate holder 10 can have advertising indicia 36 located thereon for use in promoting the automobile dealership. A license plate 22, such as a dealer's license plate, can be quickly and easily attached to the license plate holder 10 before the vehicle 18 is driven from the lot. Upon returning the vehicle 18, the license plate 22 can then be quickly and easily removed from the license plate holder 10. The license plate holder 10 can remain on the vehicle 18 at times when the vehicle 18 is not provided with the license plate 22.

FIG. 1 shows one embodiment of the license plate holder 10 affixed to the back of a vehicle 18. The license plate holder 10 is shown attached to the location on the vehicle 18 normally reserved for a license plate 22. The license plate holder 10 could also be attached to the front of the vehicle 18 at the location reserved for holding a front mounted license plate 22. However, it is to be understood that in other exemplary embodiments of the present invention that the license plate holder 10 can be attached at various locations on the vehicle 18 and need not be attached in places commonly used for license plates 22. For example, the license plate holder 10 can be attached to the bumper, deck lid, window, or hood of the vehicle 18.

The license plate holder 10 includes a frame 12 that is shown in FIG. 1 as being a relatively thin member that is rectangular in shape with a larger width than height. The frame 12 is sized so as to be roughly the same size as a conventional license plate 22. However, it is to be understood that the frame 12 can be variously sized in accordance with other embodiments. The frame 12 can be made from a variety of materials and can have various properties. For example, the frame 12 may be made of flexible plastic in accordance with one exemplary embodiment. As such, the frame 12 is flexible to some degree. Alternatively, the frame 12 can be made of a rigid material such as metal or a harder type of plastic.

The frame 12 may include advertising indicia 36 on the front surface 14 of the frame 12 that can be used to advertise the particular automobile dealership that currently owns or is selling the vehicle 18. For instance, the advertising indicia 36 may include the name of the automobile dealership. Alternatively, the advertising indicia 36 need not include the name of the automobile dealership. It is to be understood that the advertising indicia 36 need not be present in accordance with other exemplary embodiments of the present invention. If present, the advertising indicia 36 can be applied to the frame 12 in a variety of manners. For example, the advertising indicia 36 can be stamped or printed onto the front surface 14 of frame 12.

One or more punch out portions 50 can be included on the front surface 14 of frame 12. The punch out portions 50 are weakened or perforated areas of the front surface 14 that can be removed by a user in order to form an aperture in the front surface 14. Although shown as being in the shape of an elongated oval, the punch out portions 50 can be variously shaped. As shown in FIG. 1, four punch out portions 50 are present and the upper two punch out portions 50 have been removed in order to define apertures 38 through the frame 12. The apertures 38 line up with threaded holes defined in the vehicle 18 for the purpose of receiving screws for the mounting of the license plate 22. Screws 40 are inserted through the apertures 38 and engage threaded holes in the vehicle 18 in order to affix the frame 12 to the vehicle 18. Although two screws 40 are generally sufficient to affix frame 12 to vehicle 18, the user can also remove the lower punch out portions 50 to form additional apertures 38 for inserting additional screws 40. Further, it is to be understood that in other exemplary embodiments that only a single screw 40 is used to affix frame 12 to vehicle 18. Still further, other means of attachment of the frame 12 to vehicle 18 are possible. Here, frame 12 can be clamped, adhered or held through a friction fit connection to vehicle 18.

Figure 3:
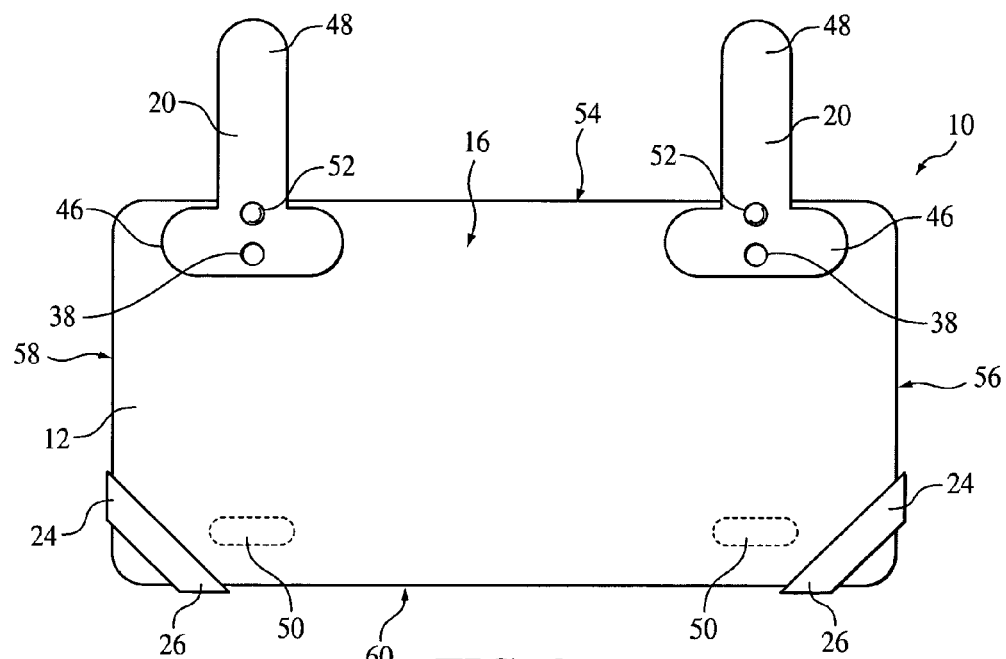
FIG. 3 is a back view of the license plate holder of FIG. 1.

The license plate holder 10 also includes a pair of retaining members 20. FIG. 3 is a back view of the license plate holder 10 that shows various features of the retaining members 20. The frame 12 includes a back surface 16 that is generally flat and has the retaining members 20 attached thereon. A rivet 52 is used to attach the retaining member 20 to the back surface 16. The rivet 52 extends through the frame 12 and is located proximate to an upper edge 54 of frame 12. Although shown as employing a rivet 52 to hold retaining member 20 to frame 12, it is to be understood that various means of attachment can be used in other embodiments. For example, the retaining member 20 can be attached to frame 12 through clips, bolts, adhesion, clamps or welding in accordance with other embodiments. Although shown as being attached to the back surface 16, it is to be understood that the retaining member 20 can be attached to the front surface 14 in accordance with other embodiments.

The retaining member 20 is made of metal and is relatively thin in accordance with the embodiments shown in FIG. 3. The retaining member 20 may be from 0.25 to 2.5 millimeters thick in accordance with various embodiments. The retaining member 20 includes a base 46 and a tab 48 that extends from the top of the base 46. The base 46 defines an aperture 38 that is coincident with the aperture 38 formed upon removing the punch out portion 50 of frame 12. In this manner, aperture 38 is thus formed through both frame 12 and retaining member 20. Screw 40 is inserted through aperture 38 and disposed through both the frame 12 and retaining member 20 when the license plate holder 10 is affixed to vehicle 18. Although shown as being defined in base 46, aperture 38 can be defined in tab 48 in accordance with other exemplary embodiments.

Referring back to FIG. 1, a pair of holding members 24 is shown in the license plate holder 10. The holding members 24 are located at the two lower corners of the frame 12. One of the holding members 24 is made of a strip 26 that extends from the side edge 56 to the lower edge 60 of the frame 12 and crosses over the front surface 14. The other holding member 24 is also made of a strip 26 and extends from side edge 58 to lower edge 60 of frame 12 and also crosses over front surface 14. The strip 26 can be 2 centimeters in width in accordance with one embodiment. However, the strip 26 can be up to 5 centimeters in width or up to 10 centimeters in width in accordance with other exemplary embodiments of the present invention. The strip 26 may be made of a variety of materials. For example, strip 26 can be made of a rigid or a flexible plastic in accordance with various embodiments. In the presently discussed embodiment, the strip 26 extends around both the front surface 14 of frame 12 and also the back surface 16 of frame 12 as more clearly shown in FIG. 3. In this regard, one of the strips 26 extends from side edge 56 to lower edge 60 and extends across the back surface 16. The other strip 26 extends from side edge 58 to lower edge 60 and also extends across the back surface 16.

The strip 26 is attached to the frame 12 so that is generally flush against the back surface 16. This can be accomplished, for instance, by stapling or adhering the part of strip 26 that extends across the back surface 16 directly to the back surface 16. The portion of strip 26 that extends across the front surface 14 is not directly stapled or adhered to the front surface 14 so that the strip 26 can be pulled away from the front surface 14. In this manner, the holding member 24 and front surface 14 of frame 12 can define a pocket 28. Although shown as being open on both the top and bottom, the pocket 28 can be closed on the bottom in accordance with other exemplary embodiments of the present invention. Additionally, although described as being defined by both the front surface 14 and strip 26, the pocket 28 can be defined by only the holding member 24 in other embodiments. Here, the holding member 24 may or may not include the strip 26.

It is to be understood that the configuration of the holding member 24 presently discussed is only exemplary and that other configurations are possible. For example, the holding member 24 may be a strip 26 that extends only from side edge 56 to the lower edge 60 across the front surface 14 and does not extend across the back surface 16. Further, the other holding member 24 can likewise be a strip 26 that extends from side edge 58 to lower edge 60 across front surface 14 but does not extend across back surface 16. Further, the holding member 24 need not include a strip 26. In these embodiments, the holding member 24 may be a triangular shaped member that has an opening for receiving a corner of license plate 22.

Figure 2:
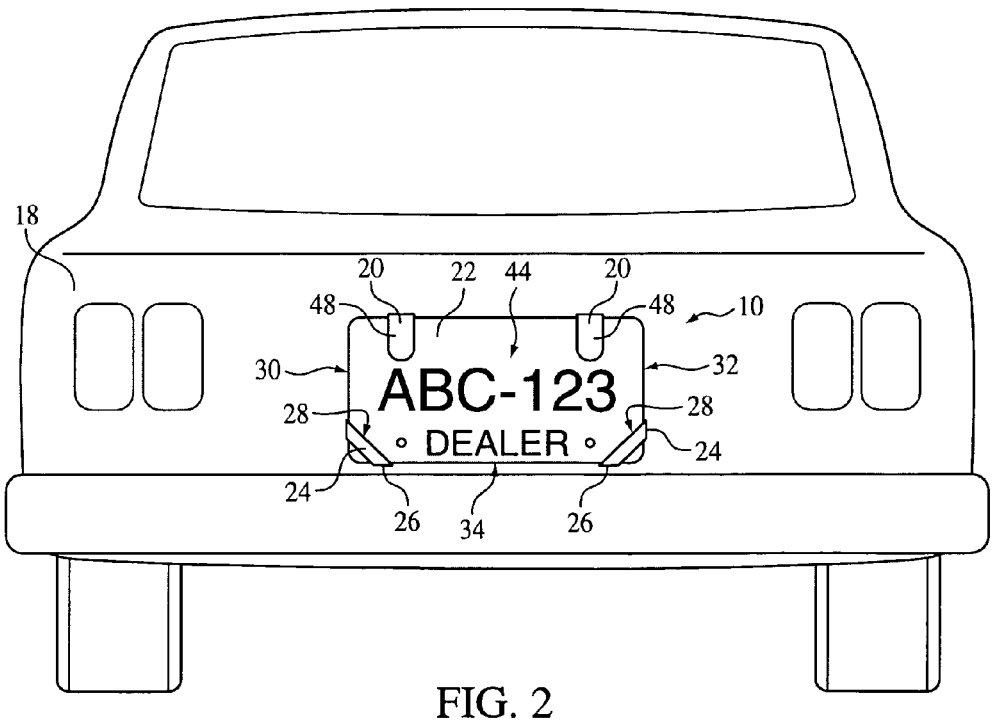
FIG. 2 is a front view of the license plate holder of FIG. 1 that is attached to a vehicle and has a license plate retained thereto.

The license plate holder 10 may be affixed to the vehicle 18 and may remain in the configuration shown in FIG. 1 when the vehicle 18 is present on the dealer's lot. Here, advertising indicia 36, if present, promotes the automobile dealership. A dealer license plate 22 is needed once the vehicle 18 is to be demonstrated or taken off the lot by a salesperson. The dealer license plate 22 can be placed over the front surface 14 of frame 12 and slid downwards so that the bottom corners of the dealer license plate 22 are positioned into pockets 28 formed by the holding members 24 and the front surface 14. Here, edges 30 and 34 of the dealer license plate 22 contact strip 26 of one of the holding members 24. Likewise, edges 32 and 34 of dealer license plate 22 contact strip 26 of the other holding member 24. Insertion of the dealer license plate 22 into the pockets 28 of the holding members 24 causes the dealer license plate 22 to be retained on the frame 12 and prevented from moving left, right or down with respect to frame 12. Placement of the dealer license plate 22 into the pockets 28 of holding members 24 is shown in FIG. 2.

The salesman may then shape the retaining members 20 so that the retaining members 20 are positioned over the front surface 44 of license plate 22. The retaining members 20 thus act to retain the dealer license plate 22 onto the front surface 14 of frame 12. Configuration of the retaining members 20 into a position capable of retaining the dealer license plate 22 is also shown in FIG. 2. The dealer license plate 22 is retained onto the license plate holder 10 by a combination of the retaining members 20 and holding members 24. The vehicle 18 may then be driven off of the lot. Placement of the dealer license plate 22 onto the location of the vehicle 18 commonly reserved for conventional license plates 22 acts to cut down on theft as the dealer license plate 22 is not in an unconventional location and does not draw as much attention thereto.

The license plate holder 10 is a temporary holder in that the dealer license plate 22 can be removed once the vehicle 18 is returned to the dealership. Here, the salesman can shape the retaining members 20 so that they do not impede the removal of the dealer license plate 22. The retaining members 20 can be shaped back into the configuration shown in FIG. 1 if desired. Next, the salesman can slide the dealer license plate 22 upwards so that the lower corners of the dealer license plate 22 are removed from the pockets 28 of the holding members 24. At such time, the dealer license plate 22 can then be removed from the license plate holder 10 and subsequently attached to a different vehicle 18 or stored at the dealership. The license plate holder 10 can remain attached to the vehicle 18 and can continue to display the advertising indicia 36 if present. The license plate holder 10 is reusable in that the dealer license plate 22 can again be attached if the vehicle 18 is to be once again driven off of the lot.

The retaining members 20 are made of a pliable material so that they can be shaped by a salesman to be positioned against and away from the front surface 44 of the license plate 22. In this regard, the tab 48 can be made out of a pliable material, such as a metal, that can be bent into and retained in a desired position. The tab 48 remains in a particular shape until the salesman grasps the tab 48 and forms it into a different configuration. Placement of screw 40 through aperture 38 acts to securely hold the base 46 of the retaining member 20 to the vehicle 18. As the base 46 is securely held, the tab 48 extending from base 46 may be more easily bent and shaped by the salesman. It is to be understood, however, that the base 46 need not be present or need not be directly held by screw 40 in other exemplary embodiments. The tab 48 is made with a relatively thin thickness and width so as to facilitate being shaped by the salesman. The tab 48 may have a width from 0.5 to 4 centimeters and may have a thickness from 0.25 to 2 centimeters in accordance with various exemplary embodiments.

The license plate holder 10 can be configured so that the retaining members 20 and holding members 24 leave the front surface 14 of the frame 12 substantially uncovered. This configuration prevents obstructions in viewing the advertising indicia 36. For example, the license plate holder 10 can be configured so that less than 20% of the surface area of the front surface 14 is covered by the retaining members 20 and/or holding member 24. In other embodiments, the license plate holder 10 can be made so that less than 10% of the surface area of the front surface 14 is covered by other components of the license plate holder 10.

Figure 4:
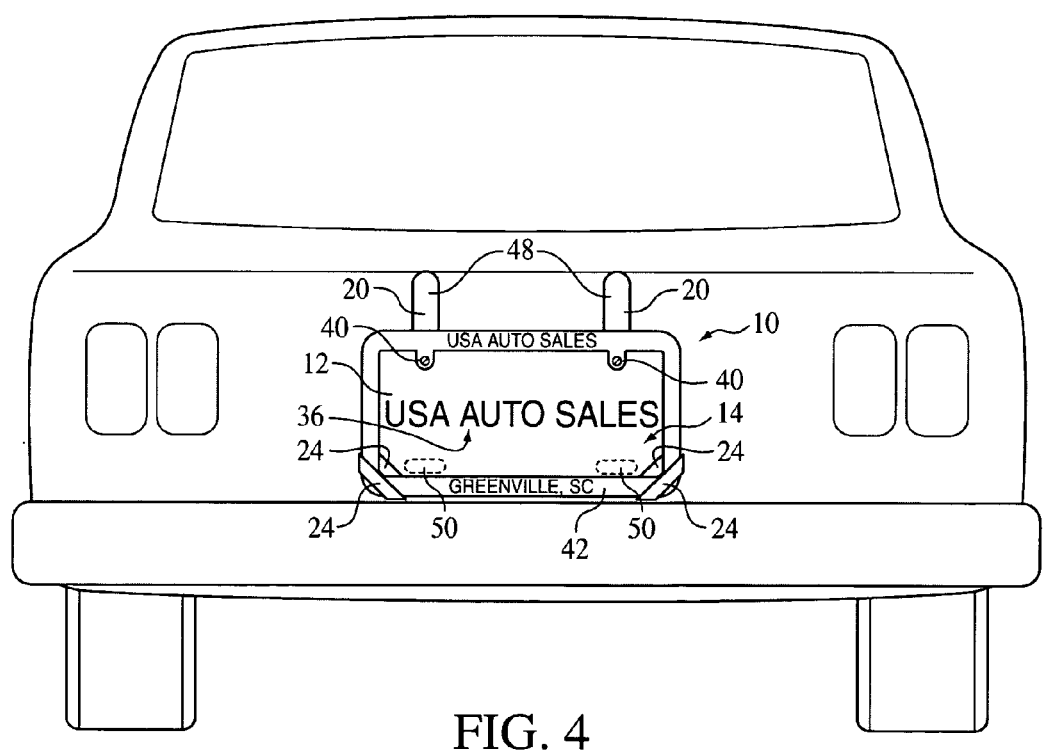
FIG. 4 is front view of a license plate holder attached to a vehicle that includes a ring in accordance with another exemplary embodiment of the present invention.

A ring 42 is shown in the exemplary embodiment of the license plate holder 10 in FIG. 4. Rings such as ring 42 are often positioned over top of license plates 22 in order to display advertising or some other message. Ring 42 in FIG. 4 has a pair of holding members 24 located thereon. The holding members 24 are positioned at the bottom corners of ring 42 and are each made of a strip 26. Strip 26 may be made of the same material and configured in the same manner as previously discussed above with respect to the other embodiments of the license plate holder 10. As shown, each of the strips 26 are attached to the back of the ring 42 and extend across a portion of the front of ring 42. Strips 26 are attached to ring 42 so as to create pockets 28 as the strips 26 are not held completely taut against the front of ring 42.

Ring 42 can be placed over the top of frame 12 to be contiguous with the front surface 14 of frame 12. Screws 40 can be inserted through apertures 38 defined through ring 42, frame 12 and retaining member 20. Ring 42 is thus secured to vehicle 18 through the use of one or more screws 40. The holding members 24 on the frame 12 are urged against the front surface 14 when the ring 42 is placed on top of the frame 12. The ring 42 thus allows the display of advertising or other writing thereon while located on the lot of the dealership.

Figure 5:
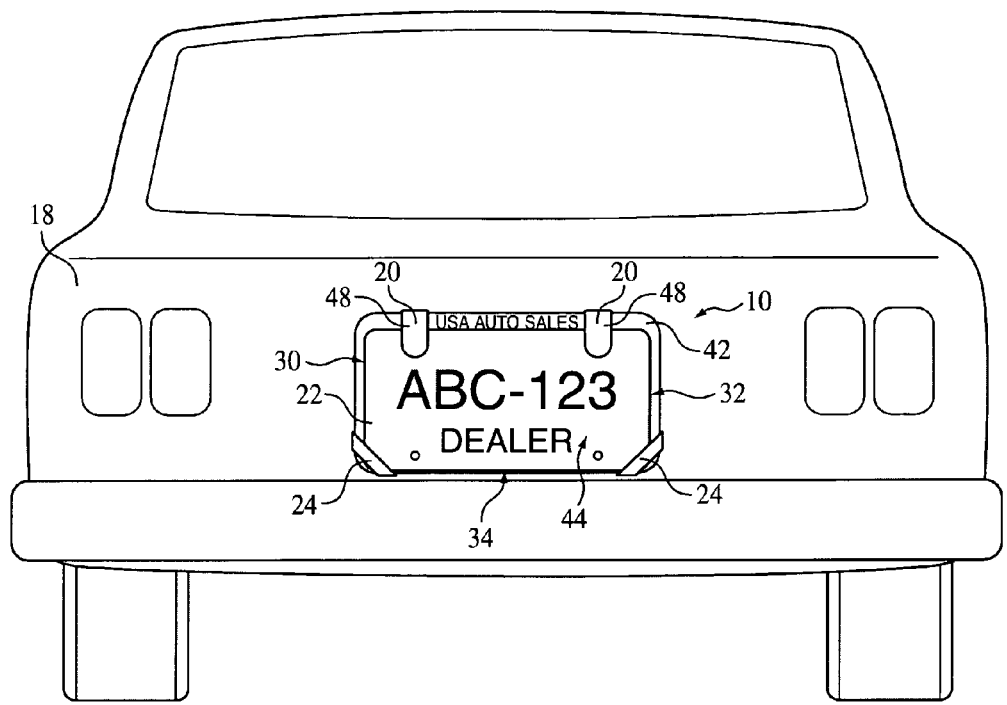
FIG. 5 is a front view of the license plate holder of FIG. 1 that is attached to a vehicle and has a license plate retained thereto.

The dealer license plate 22 may be attached to the license plate holder 10 when the vehicle 18 is to be driven from the dealership lot. FIG. 5 shows the retention of the dealer license plate 22 to the license plate holder 10. Here, the dealer license plate 22 is placed against the ring 42 and slid downwards so that the bottom corners of the dealer license plate 22 are retained into the holding members 24 of the ring 42. These holding members 24 prevent the dealer license plate 22 from moving downwards or to the left or right with respect to the license plate holder 10. Next, the tabs 48 of the retaining members 20 can be bent in order to be positioned over the front surface 14 of frame 12, ring 42 and onto the front surface 44 of the dealer license plate 22. The retaining members 20 act to retain the dealer license plate 22 onto the front of the ring 42. The aforementioned steps may be reversed once removal of the dealer license plate 22 from the license plate holder 10 is desired.

Other exemplary embodiments of the present invention exist in which the license plate holder 10 includes a ring 42 that does not have a pair of holding members 24. Here, the ring 42 can be placed onto the front surface 14 of the frame 12 and slid downwards so that the lower corners of the ring 42 are retained in the pockets 28 of the frame 12 and holding members 24 located on frame 12. The ring 42 can then be, if desired, attached with screws 40 to the frame 12. The holding members 24 on the frame 12 can be sized so that the dealer license plate 22 can be placed against ring 42 and slid downwards so that the lower corners of the dealer license plate 22 are retained between the strips 26 and the ring 42.

The license plate holder 10 can be variously configured in accordance with other exemplary embodiments. Although described as employing a pair of retaining members 20 and a pair of holding members 24, it is to be understood that any number of retaining members 20 or holding members 24 can be used. Further, it is not necessary to employ both retaining members 20 and holding members 24 in other embodiments. Additionally, the locations of the aforementioned components can be varied in other embodiments. For example, the holding members 24 can be located at the left corners, right corners or top corners of the frame 12 instead of at the bottom corners as shown. Also, the holding members may be located proximate to the side edge 56, side edge 58 or lower edge 60 instead of being proximate to the upper edge 54.

Figure 6:
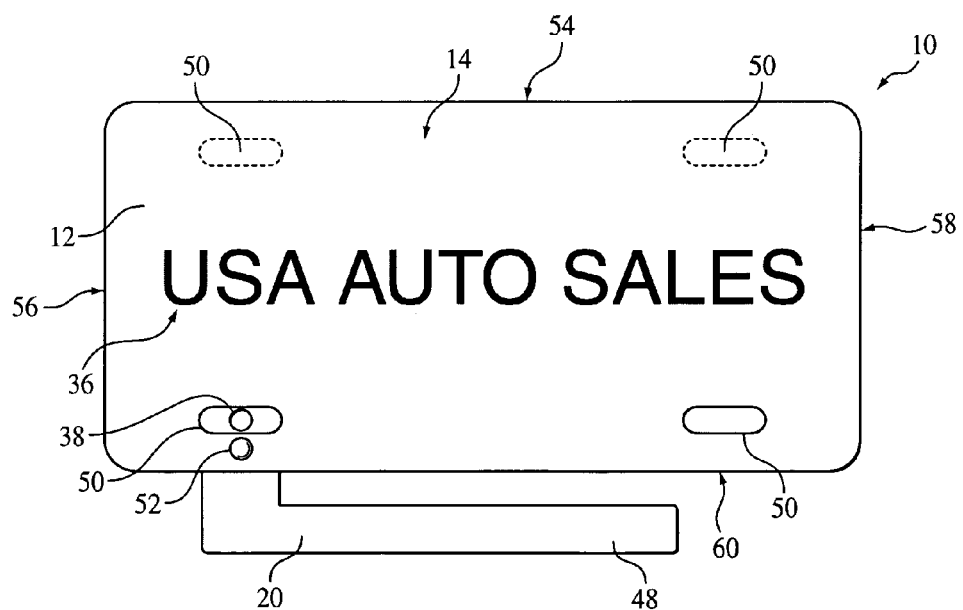
FIG. 6 is a front view of a license plate holder in accordance with another exemplary embodiment of the present invention that includes a retaining member.

FIG. 6 shows an embodiment in which a single retaining member 20 is employed and in which no holding members 24 are used. The retaining member 20 is attached to the back surface 16 of frame 12 and is located proximate to lower edge 60. The retaining member 20 is provided in such a manner in order to be shaped by the salesman to contact the front surface 44 of the dealer license plate 22. The retaining member 20 thus secures the dealer license plate 22 to frame 12 without the need for any holding members 24.

Figure 7:
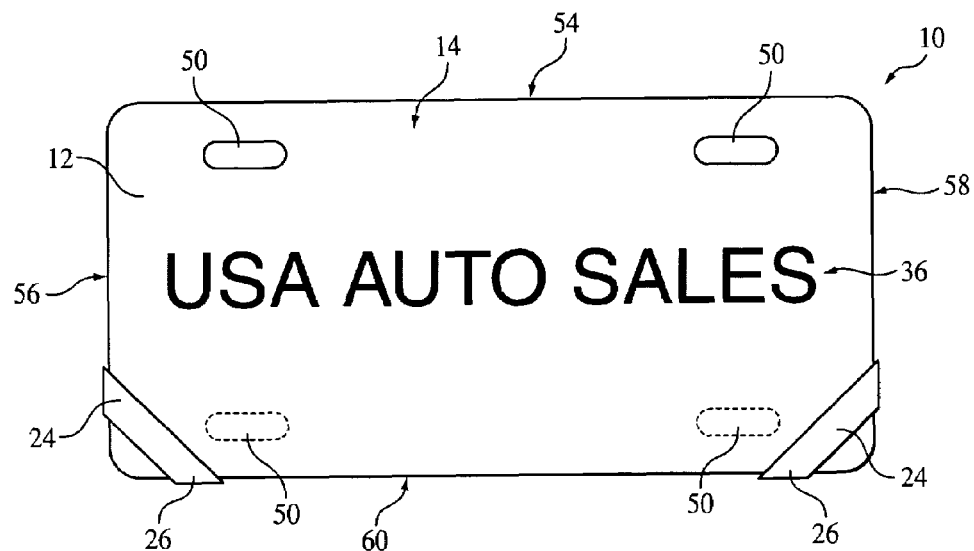
FIG. 7 is a front view of a license plate holder in accordance with another exemplary embodiment of the present invention that includes a pair of holding members.

Another alternative exemplary embodiment is shown in FIG. 7. Here, the license plate holder 10 employs a pair of holding members 24 that are located at the lower corners of the frame 12. The license plate holder 10 does not have a retaining member 20. The dealer license plate 22 can be place against the front surface 14 of frame 12 and slid downwards so that the lower corners of plate 22 are retained by the holding members 24. Here, the strip 26 of one of the holding members 24 engages edges 30 and 34 of the license plate 22, and the strip 26 of the other holding member 24 engages edges 32 and 34 of plate 22. The dealer license plate 22 is thus retained onto frame 12. Plate 22 is slide upwards and out of the holding members 24 when removal is desired.

Figure 8:
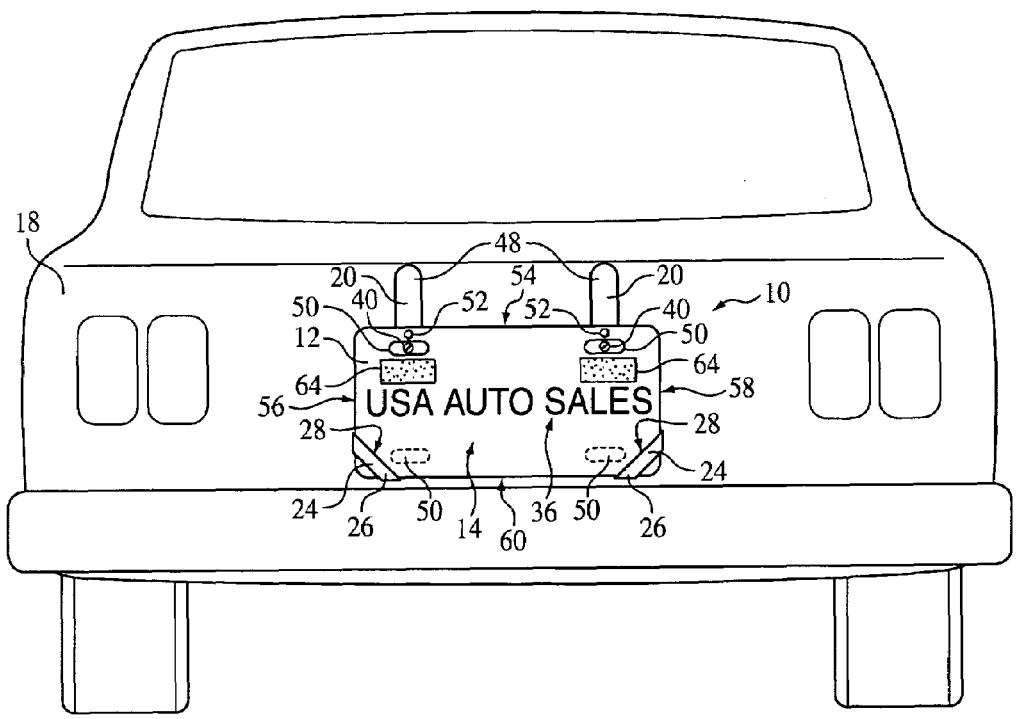
FIG. 8 is a front view of a license plate holder in accordance with another exemplary embodiment of the present invention shown attached to a vehicle.
Figure 10:
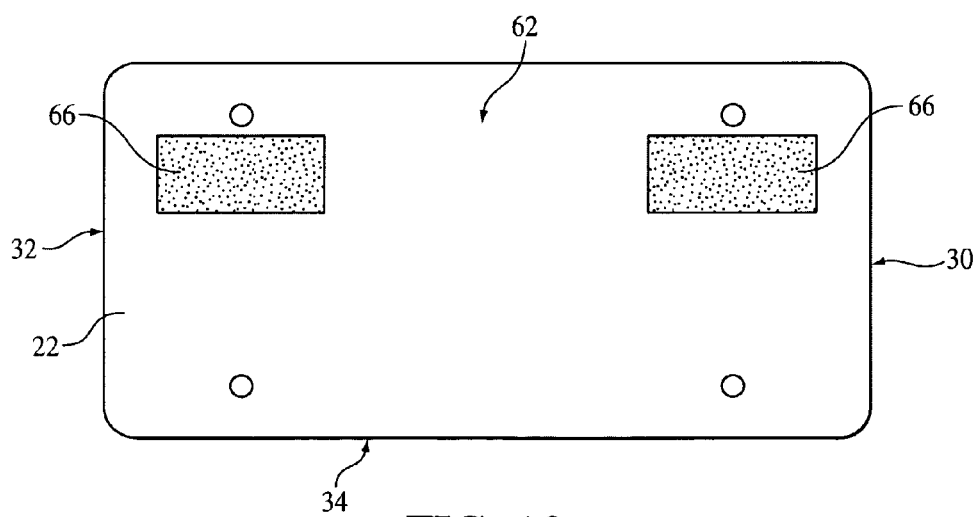
FIG. 10 is a back view of a license plate that has a portion of a hook and loop type fastener attached thereon.

The license plate holder 10 is shown in FIG. 8 as including a pair of hook portions 64 of a hook and loop type fastener. The hook portions 64 are attached to the front surface 14 of frame 12 by use of an adhesive. It is to be understood, however, that any type of attachment mechanism may be used to attach the hook portions 64 to front surface 14. Complimentary loop portions 66 can be attached to a back surface 62 of the license plate 22 as shown in FIG. 10. The license plate 22 can be positioned on the front surface 14 so that the hook and loop portions 64 and 66 attach to one another and act to hold the license plate 22 to frame 12. Additional members such as the retaining members 20 and holding members 24 can be used, if desired, in the manners described above in order to further secure the license plate 22 to frame 12. Once removal of the license plate 22 is desired, the hook and loop portions 64 and 66 can be separated and the license plate 22 may be removed. Subsequently, the license plate 22 can be reattached to the frame 12 as the aforementioned attachment is releasable.

Figure 9:
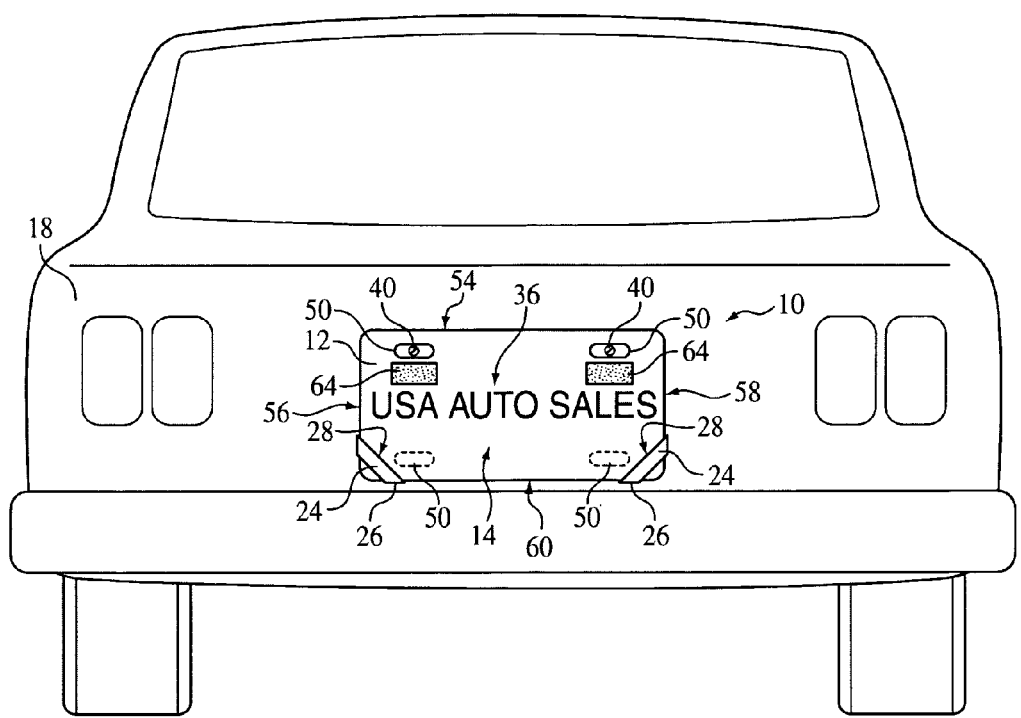
FIG. 9 is a front view of a license plate holder attached to a vehicle in accordance with another exemplary embodiment of the present invention that includes a portion of a hook and loop type fastener.

It is to be understood that various embodiments of the license plate holder 10 are possible that incorporate the hook portions 64 and/or the loop portions 66. FIG. 9 shows one such embodiment in which the only attachment mechanisms are a pair of hook portions 64 located on the front surface 14. Here, the hook portions 64 engage complimentary loop portions 66 attached to the license plate 22. In effect, the license plate 22 is retained on the frame 12 through only the use of the hook and loop portions 64, 66 and not through the use of any other attachment mechanisms. The hook and loop portions 64, 66 can be selected of a desired strength to prevent the license plate 22 from becoming detached during driving. However, in the event the frame 12 is made from a flexible material, it may be desirable to locate the hook portions 64 proximate to the apertures 38. Here, the frame 12 is secured by screws 40 through the apertures 38 so that a pulling force in this area will minimize bending of the frame 12, as would be the case if the hook portions 64 were located proximate to the side edges 56 and 58. In accordance with different exemplary embodiments, the hook portions 64 are less than on half an inch from apertures 38.

Although described as having the hook portions 64 attached to the frame 12, the loop portions 66 may be attached to frame 12 in other embodiments. Further embodiments exist in which both hook and loop portions 64 and 66 are attached to frame 12, and in which both hook and loop portions 64 and 66 are attached to license plate 22. Also, any number of hook and loop portions 64, 66 may be used in accordance with other embodiments. The present invention includes various configurations and arrangements of the attachment mechanisms described in which any one, number or combination of retaining member 20, holding member 24 or hook and loop type fastener may be used.

The license plate holder 10 can be a disposable item in accordance with various exemplary embodiments. For example, it is often the case that automobile dealerships include advertising plates that are made of a flexible plastic. The advertising plates usually include the name of the automobile dealership and are attached at the same location and in the same manner on the vehicle 18 as are normal license plates 22. These advertising plates are normally thrown away once the vehicle 18 is purchased by the customer. In a similar manner, the license plate holder 10 can be made of similar materials and function in the same way as current advertising plates. However, the license plate holder 10 has the additional functionality of holding the dealer license plate 22 to the vehicle 18. The license plate holder 10 can be disposed of upon purchase of the vehicle 18. Alternatively, the license plate holder 10 can be retained on vehicle 18 for use in holding a regular license plate 22 after purchase of the vehicle 18 if desired. Still further, the license plate holder 10 can be reused by the dealership by being placed onto a different vehicle 18 at the dealership once the original vehicle 18 is purchased.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:
1. A license plate holder, comprising:
a frame made of flexible plastic that is a single piece having a front surface that is flat and a back surface that is flat, said frame configured for being attached to a vehicle, wherein said front surface is rectangular in shape and has a width greater than a height, wherein said frame has a top edge, a bottom edge, a left side edge and a right side edge;
a first retaining member carried by said frame and configured for being shaped by a user so as to be capable of contacting a license plate for retaining the license plate to said frame, and wherein said first retaining member is configured for being shaped by a user so as to be capable of allowing the license plate to be removed from said frame, wherein said frame and said first retaining mem- ber have an aperture defined therethrough for receiving a screw for attachment of said frame and said first retaining member to the vehicle;

a second retaining member carried by said frame and configured for retaining the license plate to said frame, wherein said top edge between said first and second retaining members is a straight linear edge; and a first holding member made of flexible plastic that extends from said left side edge to said bottom edge of said frame, wherein said first holding member at least partially defines a first pocket and wherein said first holding member is configured for engaging a front surface of the license plate when the license plate is retained to said frame, and wherein said front surface of said frame has a portion that is a flat planar surface that is covered by said first holding member and engages a back surface of the license plate when the license plate is retained to said frame, wherein additional portions of said front surface of said frame that are not covered by said first holding member and are on opposite sides of said portion of said front surface that is covered by said first holding member both engage the back surface of the license plate when the license plate is retained to said frame, wherein the front surface of said license plate beyond opposite sides of said first holding member is uncovered by said first holding member and said frame such that the front surface and edges of a bottom corner of the license plate formed by said left side edge and said bottom edge of the license plate are exposed, wherein said frame from said top edge to said bottom edge and from said left side edge to said right side edge has a flat front surface having the same thickness;

wherein said frame has flexible plastic material that extends from said top edge to said bottom edge at a location between said first and said second retaining members, and wherein said frame has flexible plastic material that extends from said left side edge to said right side edge at a location between said first retaining member and first holding member;

wherein said front surface of said frame is configured for engaging the back surface of the license plate at a location between said first and said second retaining members when the license plate is retained to said frame and a screw is disposed through said aperture of said frame and said first retaining member to effect attachment to the vehicle, and wherein when said frame is attached to said vehicle said flat back surface of said frame engages the vehicle at a location that is both between said first and second retaining members and between said first retaining member and said first holding member.

2. The license plate holder as in claim 1, further comprising a second holding member carried by said frame and configured for retaining the license plate to said frame, wherein said second holding member is made of flexible plastic that extends from said right side edge to said bottom edge of said frame, wherein said second holding member at least partially defines a second pocket and is configured for engaging the front surface of the license plate when the license plate is retained to said frame, and wherein said front surface of said frame has a second portion that is a flat planar surface that has a consistent height and extends from a location in said second pocket to a location outside of said second pocket in the direction from said second pocket to the center of said frame, wherein said second consistent height portion of said flat planar surface is configured for engaging the back surface of the license plate when the license plate is retained to said frame.

3. The license plate holder as in claim 2, wherein said first and second holding members are each a flexible strip, and wherein said first pocket receives a left edge and a bottom edge of the license plate when the license plate is retained to said frame, and wherein said second pocket receives a right edge and the bottom edge of the license plate when the license plate is retained to said frame.

4. The license plate holder as in claim 2, wherein the combination of said pair of retaining members and said pair of holding members is configured to retain the license plate to said frame, wherein said top edge, said bottom edge, said left side edge and said right side edge of said frame are linear, and wherein said frame has curved corners located between said top edge and said left side edge, said top edge and said right side edge, said bottom edge and said right side edge, and said bottom edge and said left side edge.

5. The license plate holder as in claim 1, wherein said front flat surface of said frame has advertising indicia located thereon.

6. The license plate holder as in claim 1, further comprising a portion of a hook and loop type fastener attached to said front surface of said frame and configured for releasable attachment with a complimentary portion of a hook and loop type fastener attached to the license plate; and wherein said frame has a rectangular shape and is made of a flexible plastic so that said frame is flexible.

7. The license plate holder as in claim 1, wherein said frame and said first and said second retaining members are configured for retaining the license plate onto the front surface of said frame, and wherein less than 20% of the surface area of the front surface of the license plate is covered by said frame and said first and said second retaining members.

8. The license plate holder as in claim 1, further comprising:
a ring configured for attachment to a vehicle so as to be contiguous with said front surface of said frame; and
a pair of holding members carried by said ring and configured for retaining the license plate to said ring;
wherein said first retaining member is configured for being shaped by a user so as to be capable of contacting the license plate for retaining the license plate to said frame and said ring, and wherein said first retaining member is configured for being shaped by a user so as to be capable of allowing the license plate to be removed from said frame and said ring.

9. The license plate holder as in claim 1, wherein said first retaining member has a base that is attached to the back side of said frame, and wherein said first retaining member has a tab that extends from said base that is configured for being shaped by the user.

10. A license plate holder, comprising:
a frame made of flexible plastic that is a single piece having a front surface that is flat and a back surface that is flat, said frame configured for being attached to a vehicle, wherein said front surface is rectangular in shape and has a width greater than a height, wherein said frame has a top edge, a bottom edge, a left side edge and a right side edge;
at least first and second holding members carried by said frame and configured for retaining the license plate to said frame, wherein each of said holding members is configured for contacting the front surface and two edges of the license plate; and
a first retaining member carried by said frame and configured for being shaped by a user so as to be capable of contacting the front surface of the license plate for retaining the license plate to said frame, and wherein said first retaining member is configured for being shaped by a user so as to be capable of allowing the license plate to be removed from said frame, wherein said first retaining member has a base that is attached to the back side of said frame, and wherein said first retaining member has a tab that extends from said base that is configured for being shaped by the user;

a second retaining member carried by said frame and configured for being shaped by a user so as to be capable of contacting the license plate for retaining the license plate to said frames, wherein said top edge between said first and second retaining members is a straight linear edge;

wherein a first one of said holding members is a flexible strip that extends from a location beyond said bottom edge of said frame to a location beyond said left side edge of said frame, wherein said front surface of said frame and said flexible strip define a first pocket for receiving a portion of the license plate, wherein said flexible strip is configured for engaging a front surface of the license plate, wherein said front surface of said frame has a first portion that is a flat planar surface that is covered by said first holding member and engages a back surface of the license plate when the license plate is retained to said frame, wherein additional portions of said front surface of said frame that are not covered by said first holding member and are on opposite sides of said first portion of said front surface that is covered by said first holding member both engage the back surface of the license plate when the license plate is retained to said frame, wherein the front surface of said license plate beyond opposite sides of said first holding member is uncovered by said first holding member and said frame such that the front surface and edges of a bottom corner of the license plate formed by said left side edge and said bottom edge of the license plate are exposed, wherein said frame from said top edge to said bottom edge and from said left side edge to said right side edge has a flat front surface having the same thickness;

wherein said frame has flexible plastic material that extends from said left side edge to said right side edge at a location between said first retaining member and said first holding member, wherein said front surface of said frame is configured for contacting the back surface of the license plate at a location between said first and said second retaining members when the license plate is retained to said frame and a screw is disposed through said frame to effect attachment of said frame to the vehicle, and wherein when said frame is attached to said vehicle said flat back surface of said frame engages the vehicle at a location that is both between said first and second retaining members and between said first retaining member and said first holding member.

11. The license plate holder as in claim 10, wherein an aperture is defined through said first retaining member and said frame for receiving the screw for attachment of said frame and said first retaining member to the vehicle.

12. The license plate holder as in claim 10, wherein a second one of said holding members is a second flexible strip, and wherein said second flexible strip extends from a location beyond said bottom edge of said frame to a location beyond said right side edge of said frame, wherein said front surface of said frame and said second flexible strip define a second pocket for receiving a portion of the license plate, wherein said second flexible strip is configured for engaging a front surface of the license plate, wherein said front surface of said frame has a second portion that is a flat planar surface that has a consistent height and extends from a location in said second pocket to a location outside of said second pocket in the direction from said second pocket to the center of said frame, wherein said consistent height second portion of said front surface is configured for contacting the back surface of the license plate; and wherein said top edge, said bottom edge, said left side edge and said right side edge of said frame are linear, and wherein said frame has curved corners located between said top edge and said left side edge, said top edge and said right side edge, said bottom edge and said right side edge, and said bottom edge and said left side edge.

13. The license plate holder as in claim 10, wherein said front flat surface of said frame has advertising indicia located thereon.

14. The license plate holder as in claim 10, further comprising a portion of a hook and loop type fastener attached to said front surface of said frame and configured for releasable attachment with a complimentary portion of a hook and loop type fastener attached to the license plate; and wherein said frame has a rectangular shape and is made of a flexible plastic so that said frame is flexible.

15. The license plate holder as in claim 10, wherein said frame and said holding members are configured for retaining the license plate onto the front surface of said frame, and wherein less than 20% of the surface area of the front surface of the license plate is covered by said frame and said holding members.

16. The license plate holder as in claim 10, further comprising a ring configured for attachment to a vehicle so as to be contiguous with said front surface of said frame.

17. A license plate holder, comprising:
a frame configured for being attached to a vehicle, wherein said frame is made of flexible plastic, wherein said front surface has a width greater than a height, wherein said frame has a top edge, a bottom edge, a left side edge and a right side edge, wherein said front surface of said frame is flat;

a holding member configured for retaining a license plate to said frame, wherein said holding member is configured so as to be positioned in front of the front surface of the license plate extending from the intersection of the front surface of the license plate and the side edge of the license plate to the intersection of the front surface of the license plate and the bottom edge of the license plate when the license plate is retained by said holding member;

wherein said holding member is a flexible strip that extends from said left side edge of said frame to said bottom edge of said frame, wherein said holding member at least partially defines a first pocket and is configured for engaging a front surface of the license plate when the license plate is retained to said frame, and wherein said front surface of said frame has a portion that is a flat planar surface that is covered by said holding member and directly faces a back surface of the license plate when the license plate is retained to said frame, wherein additional portions of said front surface of said frame that are not covered by said holding member and are on opposite sides of said portion of said front surface that is covered by said holding member both directly face the back surface of the license plate when the license plate is retained to said frame, wherein the front surface of said license plate beyond opposite sides of said holding member is uncovered by said holding member and said frame such that the front surface and edges of a bottom corner of the license plate formed by the left side edge and the bottom edge of the license plate are exposed, wherein said frame from said top edge to said bottom edge and from said left side edge to said right side edge has a flat front surface having the same thickness;

a first retaining member carried by said frame and configured for being shaped by a user so as to be capable of contacting the front surface of the license plate for retaining the license plate to said frame, and wherein said first retaining member is configured for being shaped by a user so as to be capable of allowing the license plate to be removed from said frame, wherein said first retaining member has a base that is attached to the back side of said frame, and wherein said first retaining member has a tab that extends from said base that is configured for being shaped by the user; and a second retaining member carried by said frame and configured for being shaped by a user so as to be capable of contacting the license plate for retaining the license plate to said frame;

wherein said frame has flexible plastic material that extends from said top edge to said bottom edge at a location between said first and said second retaining members, and wherein said frame has flexible plastic material that extends from said left side edge to said right side edge at a location between said first retaining member and said holding member;

wherein said front surface of said frame is configured for engaging the back surface of the license plate at a location between said first and said second retaining members when the license plate is retained to the frame and a screw is disposed through said frame to effect attachment to the vehicle.

* * * * *